US00RE34680E

United States Patent [19]

Lieser

[11] E Patent Number: Re. 34,680

[45] Reissued Date of Patent: Aug. 2, 1994

[54] SCREW TOOL

[75] Inventor: Karl Lieser, Wuppertal, Fed. Rep. of Germany

[73] Assignee: Wera Werk Hermann Werner GmbH & Co., Wuppertal, Fed. Rep. of Germany

[21] Appl. No.: 742,886

[22] Filed: Aug. 9, 1991

Related U.S. Patent Documents

Reissue of:

[64] Patent No.: 4,884,478
Issued: Dec. 5, 1989
Appl. No.: 98,374
Filed: Sep. 17, 1987

[51] Int. Cl.[5] ..... B25B 13/00
[52] U.S. Cl. ..... 81/59.1; 192/44
[58] Field of Search ..... 81/59.1, 63.1; 192/38, 192/44, 45

[56] References Cited

U.S. PATENT DOCUMENTS

| | | | |
|---|---|---|---|
| 1,878,053 | 9/1932 | Winger | 81/59.1 |
| 2,497,361 | 2/1950 | Kesterton | 192/44 |
| 2,584,256 | 2/1952 | Brown | 192/44 |
| 2,685,355 | 8/1954 | Stoue . | |
| 2,860,750 | 11/1958 | Avanzati | 192/44 |
| 2,997,148 | 8/1961 | Linsley | 192/44 |
| 3,908,487 | 9/1975 | Plaw | 81/59.1 |
| 4,004,666 | 1/1977 | Hinojosa | 192/44 |
| 4,051,935 | 10/1977 | Nakayama | 81/59.1 |
| 4,297,924 | 11/1981 | Stephens | 192/44 |
| 4,669,339 | 6/1987 | Cartwright | 81/59.1 |

FOREIGN PATENT DOCUMENTS

| | | |
|---|---|---|
| 2244222 | 3/1973 | Fed. Rep. of Germany . |
| 2240922 | 3/1974 | Fed. Rep. of Germany . |
| 2503372 | 7/1975 | Fed. Rep. of Germany . |
| 2705134 | 8/1978 | Fed. Rep. of Germany . |
| 3344361 | 4/1985 | Fed. Rep. of Germany . |

*Primary Examiner*—James G. Smith
*Attorney, Agent, or Firm*—Martin A. Farber

[57] ABSTRACT

A screw tool has a direction-reversible catch including clamping members disposed within wedge-shaped clamping spaces between an outer drive ring part (5) and an inner driven core part (8) of approximately triangular shape in cross section, the clamping members are displaceable by a rotatable switch member which is lockable in its switch positions into release with respect to the wedge walls of the corresponding clamping space by drivers acting on the clamping members and blocking the passage of the clamping members into, in each case one of their two clamping positions, and it proposes, in provide for a structurally simple friction-minimized construction wherein each clamping member lies loosely in a clamping space and is displaceable into its clamping position by the rotation of the drive ring part.

26 Claims, 7 Drawing Sheets

33
32
56
35
37
38
40
X
39
X
42
44
46
34
58'
36
VII
47
VII
41
53
34'
52
58
48
45'
49
45
51
50
54
55
57
43

SCREW TOOL

Matter enclosed in heavy brackets [ ] appears in the original patent but forms no part of this reissue specification; matter printed in italics indicates the additions made by reissue.

FIELD AND BACKGROUND OF THE INVENTION

The present invention relates to a screw tool.

A screw tool is known from Federal Republic of Germany OS 3 344 361, in which the driven core part of triangular cross section forms with the outer drive ring part the wedge-shaped clamping spaces for the reception of roller-shaped clamping members arranged in pairs. Between each pair of clamping members there extends a compression spring which acts on them and presses the clamping members into the wedge-shaped clamping spaces. The shifting of the clamping members in order to obtain different directions of drive is effected by means of the centrally mounted switch member from which drivers bent off at an angle extend. In this connection, three such drivers are provided, they extending in each case between a pair of the clamping members. For the free rotatability of the drivers the triangle corners are cut off concentricaly to the center of rotation so that the drivers can move there into the adjacent clamping spaces, regardless of the direction in which the driving of the driven core part is desired. For the fixing of the switch member in its switch positions there is provided a detent ball which is arranged in the driven core part and which cooperates with the switch member. Aside from the structural shape which is expensive from a standpoint of manufacture, as a result of the large number of structural parts, unfavorable frictional conditions exist which upon longer use of the screw tool, lead to premature phenomena of fatigue.

SUMMARY OF THE INVENTION

The object of the present invention is to simplify the construction of a screw tool of the type in question and develop it in such a manner that friction is minimized so as to obtain optimum operating conditions. This object is achieved by one clamping member each (24, 58) lies loosely in it clamping space and is displaceable into its clamping position by the rotation of the drive ring part (3, 34).

As a result of this development, a screw tool of this type which is of increased value of use is obtained. The construction of the screw tool is simplified because of the reduced number of parts. It has been found that three clamping members are sufficient in order to obtain the desired action. If the switch member and thus the drive means are in a neutral central position then the driven core part is carried along upon the rotation of the drive ring part in each direction, the clamping members being carried along into their clamping position exclusively by the rotation of the drive ring part. If, on the other hand, driving in one direction and free travel in the other direction are desired, then the switch member must be turned into the corresponding position, in which case the drivers block the access to one clamping corner of the clamping space. Upon drive along in rotation the clamping members now engage into the corresponding clamping corners. A turning of the drive ring part in the direction of free travel then leads to the rolling of the clamping members out of said clamping corners. It has been found that this loose insertion of the clamping members results in a reduction in friction of about 20% as compared with traditional structural shapes so that premature phenomena of fatigue upon lengthy operation of the screw tool are counteracted. This is of particular importance when the screw tool is developed as a screwdriver. Barreling of the sides of the triangular driven core part leads to a continuous guiding of the clamping members into the corresponding clamping corners of the clamping spaces. In this way protection against overload is obtained which leads to a lengthening of the life of the screw tool. In order to develop the barreled triangle sides free from incisions, the driven core part bears the spring-loaded detent ball in a blind hole along one of its angle bisectors. The corresponding detent depressions which cooperate with the ball are located on the inner wall of the cup-shaped switch member. In this way defined switch positions can be favorably obtained so that the drivers of the switch member which are developed as axially protruding fingers enter in accordance with their purpose into the corresponding position. A stable supporting feature of the switch member is the driven core part which has concentrically extending guide surfaces which are transverse to the angle bisectors and rest against the cup inner wall of the switch member. The bearing length of the switch member is further increased by the central guide collar of the driven core part which enters into the bore in the bottom of the cup of the switch member. The guide sleeve provides a low-friction and nevertheless stable support for the driven core part. The guide sleeve which is equipped with bearing ribs and is arranged turnably in the inner body of the screwdriver handle. This inner body is a part of the drive ring part, which leads to a further saving of structural parts. Furthermore, the ribs are provided on the end regions of the guide sleeve so that even large canting forces are dependably counteracted. A stable interpolation is assured the roller-shaped clamping members so that a part of their end surface rests against bottom surfaces whichare formed in the region of the clamping spaces by protrusions of the driven core part. It is possible to produce the barrelled sides of the triangle in the case of polygonal turning by means of single-tooth fly cutter. This also results in the outer edges of the bottom surfaces and of the guide surfaces supplementing each other to form a circle, together with advantages from a manufacturing standpoint. Optimum control of the clamping members is obtained by the drivers of the switch member which extend to the bottom surfaces. In this way the axial length of the clamping members corresponds to that of the drivers. The surface of the cup edge of the switch member secures the position of the clamping members in the other direction by gripping the other end surfaces of the roller-shaped clamping members. The detent depressions thereof are so developed that the middle one corresponds in a form-locked manner to the ball entrance cross section. The two adjacennt detent depressions are, however, enlarged in the direction of rotation and provided with a concave bottom. Depending on the direction of rotation of the switch member, the detent ball then dips into the corresponding adjacent detent depression and is brought into the centering position by the compression spring which acts upon it. In this way, the switch member can move over a larger path and this embodiment also makes it possible, upon displacement of the drive ring part in the direction of free-travel, for a slight evasion movement of the drivers to also be obtained without the switch member moving out of its switch position.

DETAILED DESCRIPTION OF THE PREFERRED EMBODIMENTS

Figure 1:
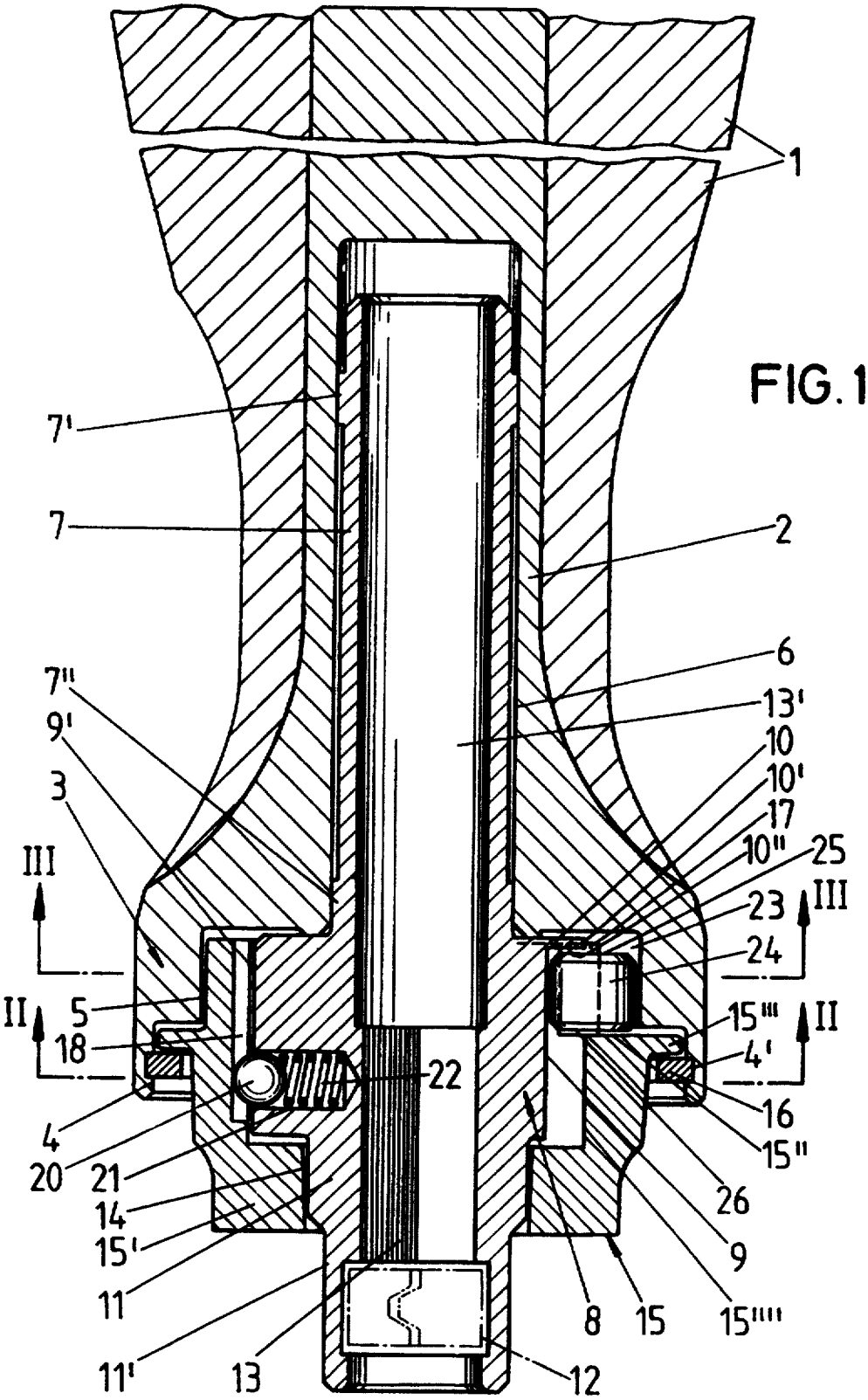
FIG. 1 shows in enlarged size a longitudinal section through the screw tool according to the first embodiment associated with a screwdriver handle, the switch member being in the center position.
Figure 2:
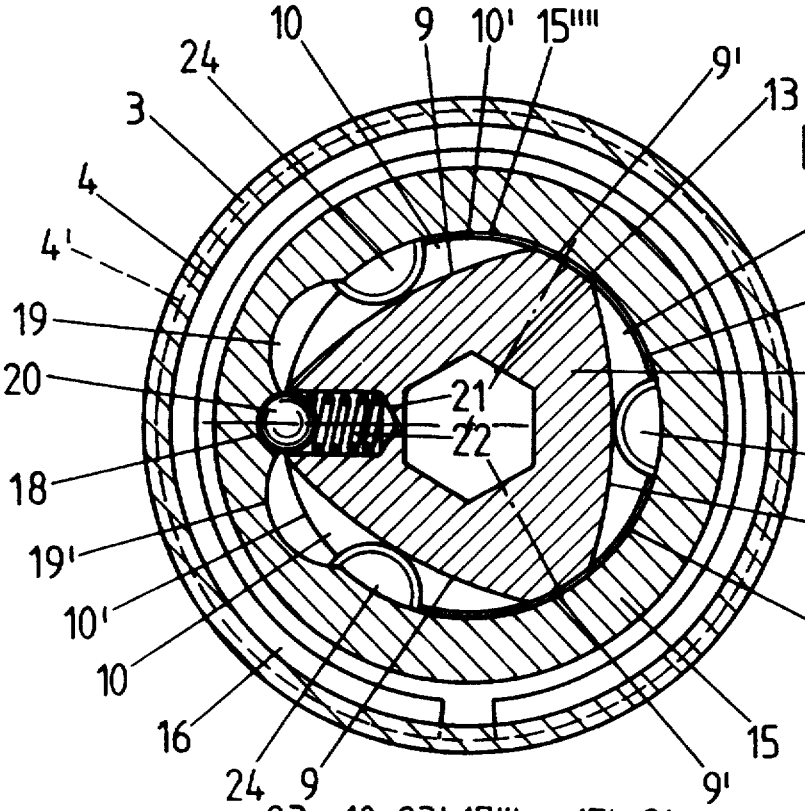
FIG. 2 is a section along the line II—II of FIG. 1.
Figure 3:
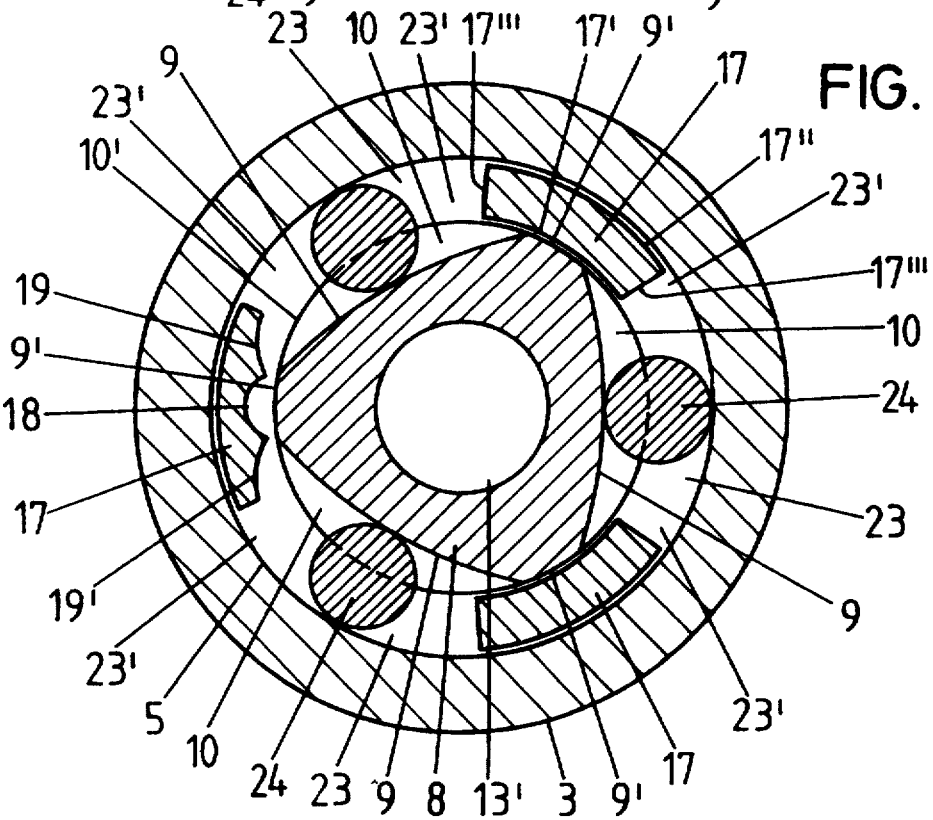
FIG. 3 is a section along the line III—III of FIG. 1.

The screw tool developed as a screwdriver in accordance with the first embodiment shown in FIGS. 1 to 5 has a screwdriver handle 1 which is provided with an axially arranged inner member 2. The latter is seated, non-rotatably, in the screwdriver handle 1 and at its lower end forms a drive ring part 3 of larger cross section; see FIG. 1. In the free end of the drive ring part 3 there are produced stepped bore sections 4, 5, 6 in such a manner that the bore sections 4, 5 lie along the height of the drive ring part 3. The bore section 6 of smaller cross section which extends within the inner member 2 receives for rotation a bearing sleeve 7 which is equipped with rotating baring ribs 7',7'', said sleeve being integral with a driven core part 8 arranged within the drive ring part 3. The driven core part 8 which is of triangular cross section has barrel-shaped triangle sides 9. Their degree of curvature is less than that of the wall of the bore section 5. The driven core part 8 forms guide surfaces 9' which are concentric to the bore section 5 and transverse to the angle bisectors, said guide surfaces connecting the triangle sides 9 to each other. The barreled triangle sides 9 are formed by polygonal turning, as a result of which protrusions 10 which rest on the bottom of the bore section 5 are formed. Their outer edges 10' and the guide surfaces 9' supplement each other to form a circle; see in particular FIGS. 2 and 4.

On the other side of the free end of the drive ring part 3, the driven core part 8 continues in a stepwise guide collar 11. Adjoining the latter there is a stepwise stepped-down extension 11'. The latter serves to receive a clamping spring 12 indicated in dash-dot line, for the frictional holding of a screwdriver insert part of hexagonal cross section. For the reception thereof a hexagonal opening 13 is provided in the driven core part 8 on the other side of the clamping spring 12, a bore 13' of larger cross section which passes through the bearing sleeve 7 adjoining it.

The guide collar 11 of the driven core part 8 passes through a bore 14 in the cup bottom 15' of a cup-shaped switch member 15. The cup rim surface 15'' thereof extends in front of the transition step between the bore sections 4 and 5 and forms there an outwardly directed collar 15'''. A lock spring washer 16 which engages into an inner groove 4' of the bore section 4 places itself in front of said collar and holds the switch member 15 and thus also the driven core part 8 in its axially non-displaceable position with respect to the drive ring part 3.

The guide surfaces 9' plus driven core part 8 lie against the cup inner wall 15'''' and thus increase the bearing length of the switch member 15. Three drivers 17 located at equal angular distance apart extend from the cup rim surface 15''. They are shaped as axially protruding fingers and are integral with the switch member 15. The switch member 15 including the drivers 17 can be made of plastic. At the height of one driver 17 the switch member 15 is equipped with groove-shaped detent depressions 18, 19 and 19' which extend in axial direction and cooperate with a detent ball 20 of the driven core part 9. For this purpose, the driven core part 8 is provided on one of its angle bisectors with a blind core 21 to receive the detent ball 20 and a compression spring 12 which urges the ball in outward direction. In accordance with FIGS. 1 to 3, the protruding region of the detent ball 20 engages in form-locked manner into the central detent depression 18 so that in this position all drivers 17 are opposite the guide surfaces 9' of the driven core part 8 of triangular cross section. The two detent depressions 19, 19' which are directly adjacent the central detent depression 18 are enlarged in direction of rotation and provided with a concave bottom.

The inner surfaces 17' of the drivers 17 are aligned with the cup inner wall 15'''' while the outer surfaces 17'' are guided by the wall of the bore section 5 of the drive ring part 3. Otherwise, the drivers 17 extend up to the protrusions 10 of the driven core part 8; see FIG. 1.

Between the triangle sides 9 of the driven core part 8 and the wall of the bore section 5 clamping spaces 23 are formed. Each of these clamping spaces 23 forms clamping cornners 23' in its circumferential end regions. In each clamping space 23 there loosely lies a roller-shaped clamping member 24. In the central switch position of the switch member 15 the clamping members 24 lie approximately on a line with the vertex of the barreled triangle sides 9; see FIGS. 2 and 3.

The roller-shaped clamping members 24 have a part of their one end surface 25 in front of the bottom surfaces 10'' of the protrusions 10 and are accordingly secured in position in one direction by them. The securing in position in the other direction is imparted to the clamping members 24 by the cup rim surface 15'' of the switch member 15 which engages over the other end surface 26. Since the drivers 17 extend to the bottom surfaces 10'' of the protrusions 10 or even slightly beyond them, along radial control surfaces 17''' are present on the drivers 17.

This embodiment operates as follows:

If the switch member 15 is in the central switch position (see FIGS. 1 to 3), then, upon the turning of the screwdriver handle 1, the driven core part 8 is carried along in each direction by means of the drive ring part 3, due to the entraining of the clamping members 24 into the corresponding clamping corners 23'. Free travel then does not take place.

Figure 4:
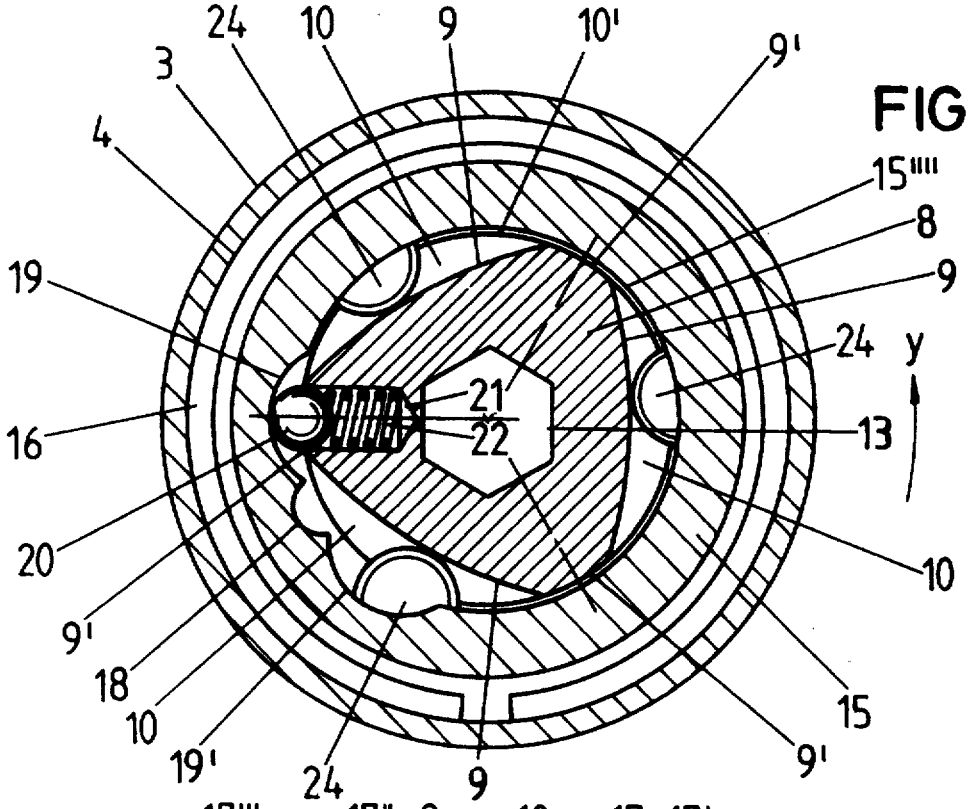
FIG. 4 is a section corresponding to FIG. 2, the switch member being shifted into a different switch position in order to change the direction of drive.
Figure 5:
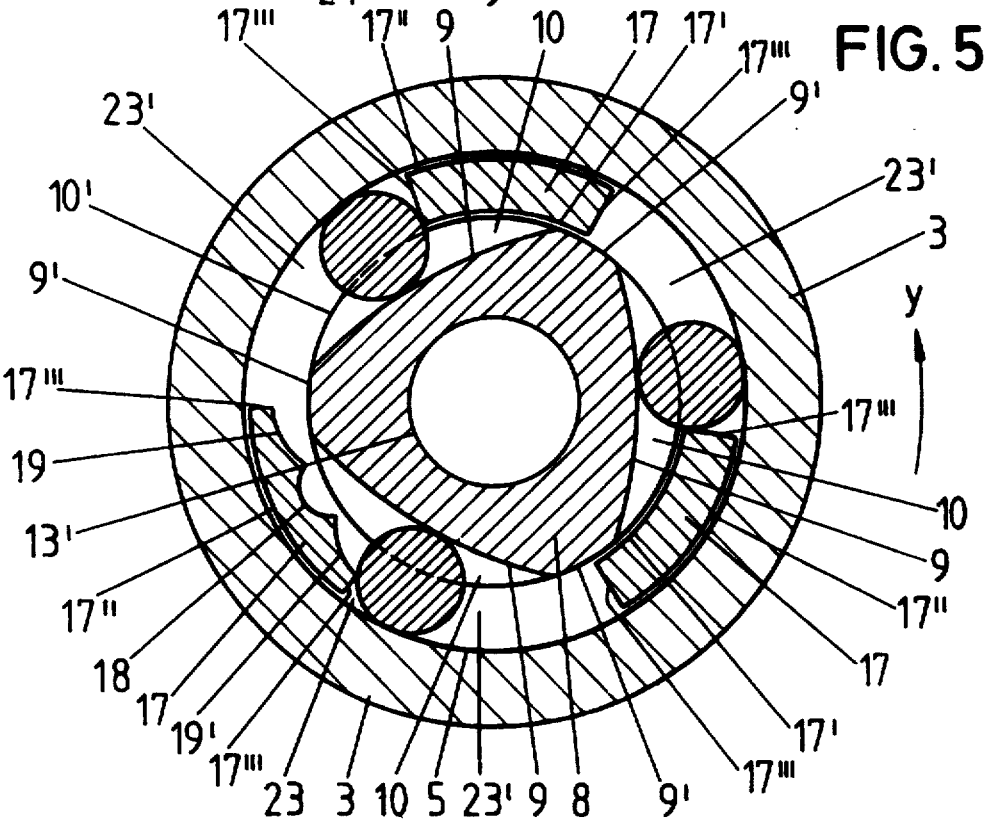
FIG. 5 is a section similar to FIG. 3, but with the switch ring shifted.

If, on the other hand, the driven core part 8 is to be carried along in the direction of the arrow y in accordance with FIGS. 4 and 5, then the switch member 15 must be turned in such a way that the detent ball 20 engagably enters the detent depression 19. The drivers 17 extending from the switch member 15 thereby displace the clamping members 24 by a certain amount from their center position in the direction towards the corresponding clamping corner 23' of the clamping spaces 23. If the drive ring part 3 or the screwdriver handle 1 is now turned in the direction indicated by the arrow y, then, due to friction, this displaces the clamping members into the clamping position so that in this way the driven core part 8 is also rotates in the direction indicated by the arrow y. Upon the opposite direction of rotation, the clamping members 24 are displaced from the corresponding corners 23', which corresponds to free travel. The drivers 17 and thus the switch member 15 can possibly be turned slightly by the clamping members 24. Nevertheless, the detent ball 20 remains in its detent depression 19.

If the driven core part 8 is to be driven in the other direction of rotation, then the switch member 15 must be turned in such a way that the detent ball 20 enters into the detent depression 19'.

In accordance with the second embodiment, shown in FIGS. 6 to 11, the screw tool has a screwdriver handle 32 to receive the sleeve 33 of a drive ring part 34. Within the sleeve 33 there is rotatably arranged a bearing bushing 35 of a driven core part 36. In order to obtain reduced friction between the sleeve 33 and the bearing bushing 35, the bearing bushing 35 forms an annular groove 37 into which bearing balls 38 of the sleeve 33 engage. The bearing balls 38 are seated in three radial bores 29 of sleeve 33 which are arranged at equal circumferential distances apart; see in particular FIG. 10. At the place of the radial bores there is a spring washer 40 which is introduced from the outside into the sleeve 33. It prevents plastic material from coming into the radial bores 39 upon the spraying-on of the handle 32 which is to be made from plastic.

A bore 41 is produced starting from the end surface 34' of the drive ring part 34. Within it the driven core part 36 which forms an equilateral driven triangle is rotatably mounted in such a manner that the vertices 36' of the triangle are guided on the inner wall 41' of the bore 41.

The bearing bushing 35 of the driven core part 36 rotatably receives a stepped tubular shank 42 of a tool-holder sleeve 43. The sleeve is hexagonal in cross section and the end of it which faces the shank 42 enters in form-locked manner into a triangular recess 44 in the driven core part 36. The inner surfaces 44' of the triangular recess 44 extend in this connection parallel to the triangle sides 36'' of the triangular drive core part 36. In this way, wall sections 45 which are directed along a triangle are created which come into form-lock with the corresponding polygonal surfaces of the tool-holder sleeve 43. The outer end surfaces 45' of these wall sections 45 which form triangle sides are beveled. The recess 44 is opened in the region of the vertices 36' of the triangle by slitting 46. In this way, detent depressions 47 are formed in the region of the triangle vertices 36' to receive detent balls 48 which form the drivers. The detent balls extend in bores 49 of a switch member 50 which is rotatably associated with the drive ring part 34. Three detent balls 48 are provided corresponding to the triangular driven core part and accordingly also three bores 49 spaced circumferentially equally apart. The detent balls 48 are acted on by compression spring 51 which press the detent balls 48 into the detent depressions 47. For turnable association, the switch member 50 forms on its end surfaces facing the drive ring part 34 an edge-side collar 52 which extends into an edge-side annular groove 53 of the drive ring part 34. For the passage of the tool-holder sleeve 43, the switch member 50 forms a central bore 54. The latter is so large that turnability of the switch member 50 is assured. The switch member 50 is imparted assurance against being pulled off by a lock washer 55 of the tool-holder sleeve 43 on which lock washer 55 the switch member 50 rests.

The tool-holder sleeve 43 on its part is also secured against being pulled off by a lock washer 56. The latter is seated on the end of the shank 2 of the tool-holder sleeve which extends beyond the bearing bushing 35 and rests against the end surface there of the bearing bushing 35.

The tool-holder sleeve 43 is provided on its inside with a polygonal edge 57 for the insertion of the tool, in order to be able to drive the latter.

As coupling means between driven core part 36 and drive ring part 34 there are employed clamping members 53. The latter are located in the region between the inner wall 41' of the bore 41 of the drive ring part 34 and the wall sections 45 of the driven core part 36. In this way three segment-like clamping spaces are created. The roller-shaped clamping members 58 are located in the region of the largest radial dimension of these spaces. The clamping members extend to the bottom of the bore 41 and terminate flush with the end surface 34' of the drive ring part 34 and thus also with the end surface of the driven core part. The ends there of the clamping members are provided with frustoconical bevels 58'. Each clamping member 58 forms a space divider so that clamping corner 59, 60 which extend in wedge shape on both sides thereof are produced.

Figure 6:
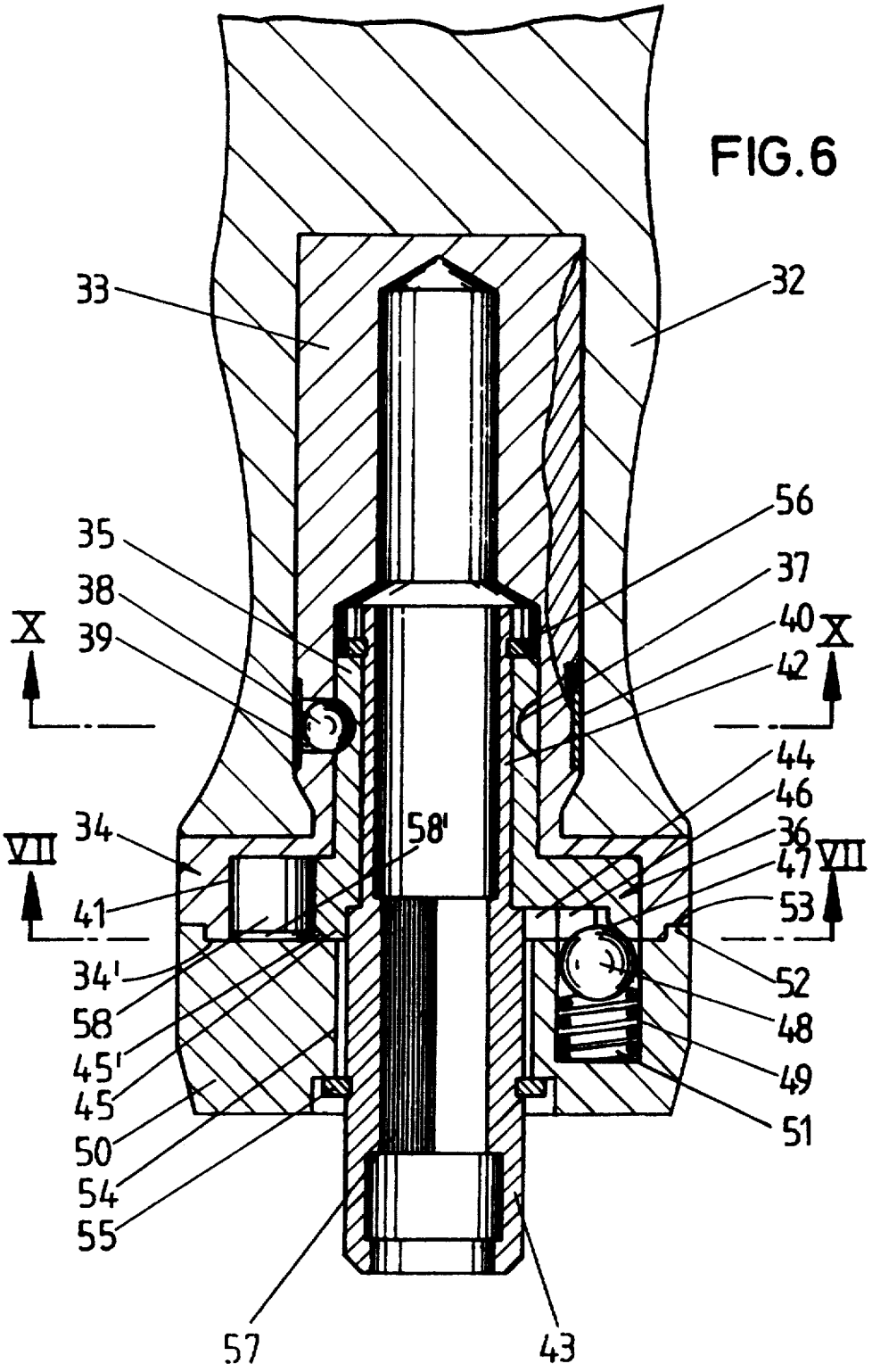
FIG. 6 shows on a larger scale a longitudinal section through the screw tool in accordance with the second embodiment.
Figure 7:
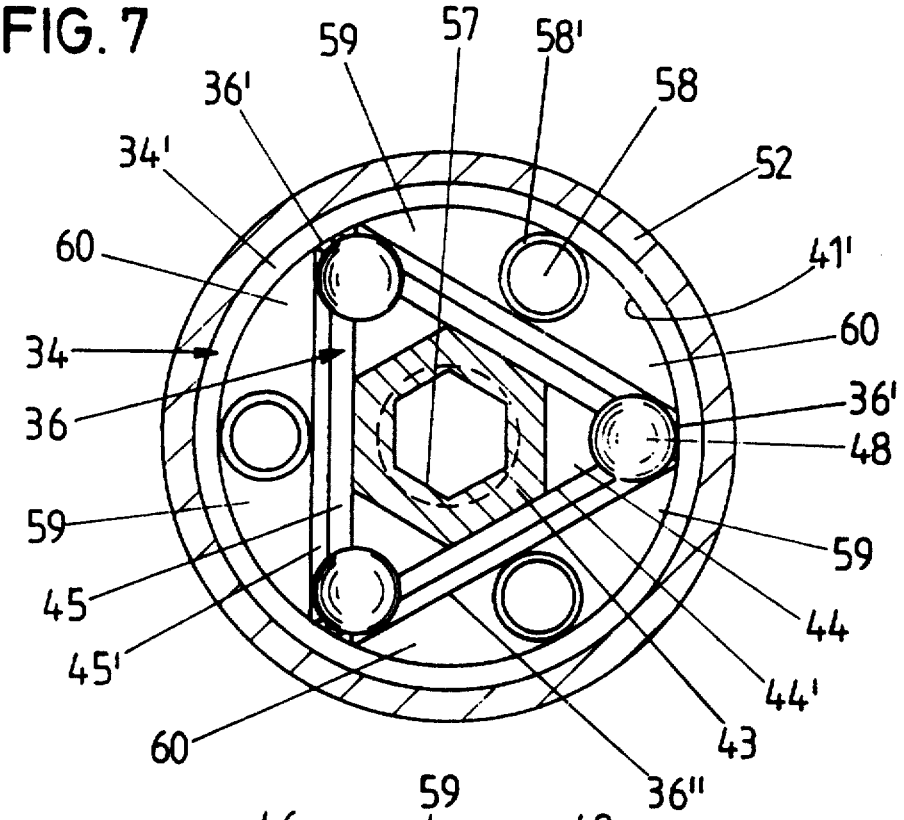
FIG. 7 is a section along the line VII—VII of FIG. 6.

The manner of operation of the screw tool last described is as follows:

If the switch member 50 assumes its central position in accordance with FIGS. 6 and 7, then the detent balls 48 lie in the detent depressions 47 within the region of the vertices 36' of the triangle. Upon the turning of the handle 32 or of the drive ring part 34 which is connected, fixed for rotation, with it, the driven core part 36 is carried along in both directions of rotation.

Figure 8:
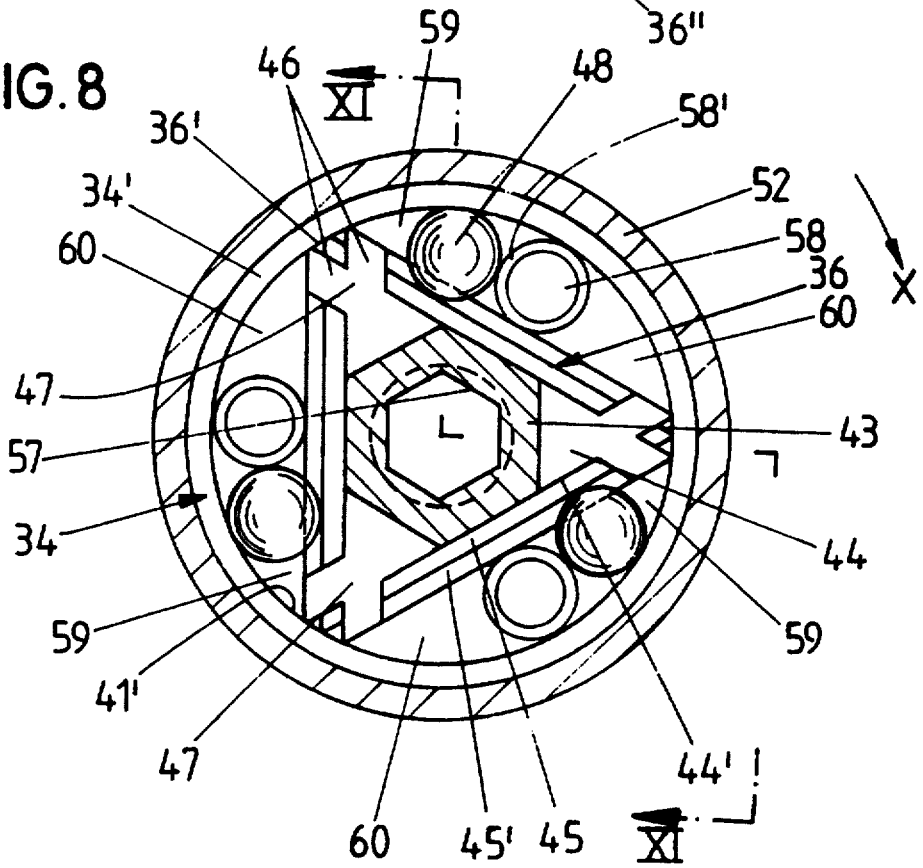
FIG. 8 is a view corresponding to FIG. 7 but with the switch member turned into the one switch position.

If it is desired that the driven core part 36 be carried along in the direction of the arrow x in FIG. 8, then the switch member 50 must also be turned in that direction. In this case the detent balls 48 are carried along. They pass through the one slit and pass into the corners 59. There they receive a threefold support, in that they come against the inner wall 41', against the outer surface of the clamping members 58, and against the beveled end surfaces 45' of the wall section 45. In this way the clamping members 48 are urged in the direction of the clamping corners 60 so that upon rotation of the drive ring part 34 in the direction indicated by the arrow x the driven core part 36 is driven along. An oppositely directed rotary movement of the drive ring part, on the other hand, does not lead to any driving along of the drive core part 36 so that this is the free travel.

Figure 11:
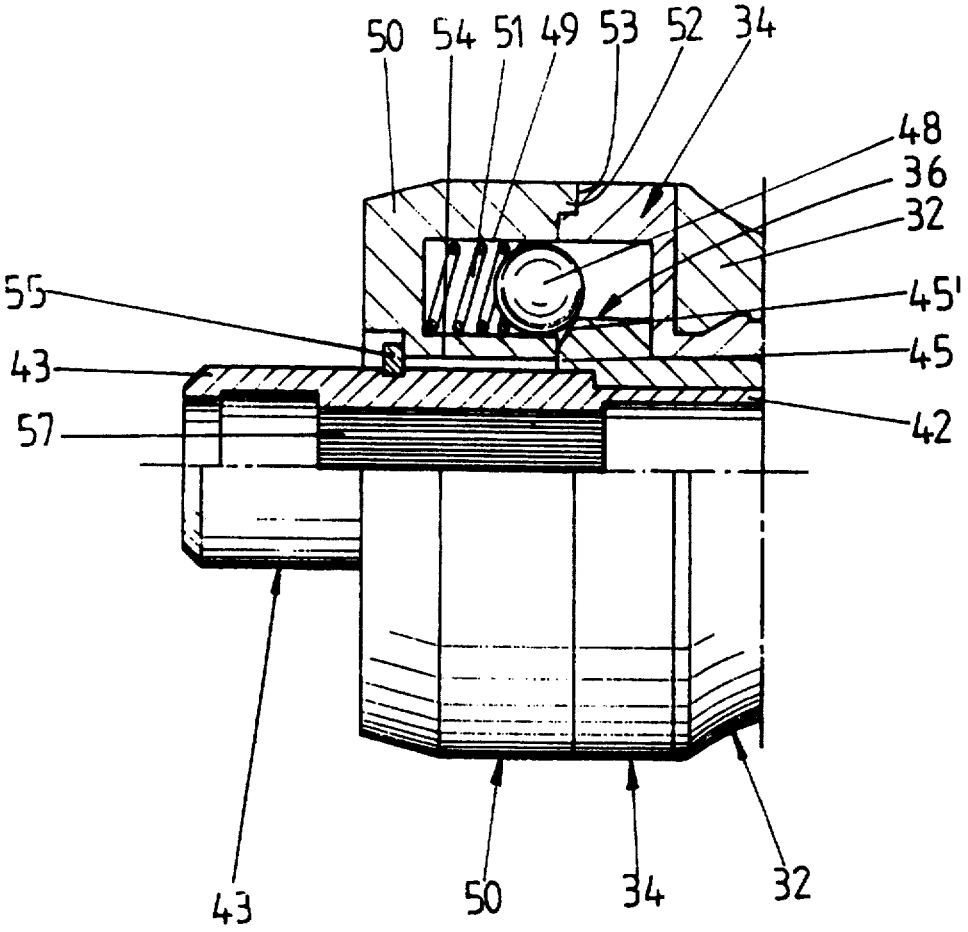
FIG. 11 is a section along the line XI—XI of FIG. 8.

FIG. 11, in particular, shows that in the switch position the detent ball 48 cannot rest on the bottom of the bore 41 of the drive ring part 34. This is important in order to permit the bringing back of the switch member ring into the central position, in which connection the detent balls after passing through the corresponding slit pass into the detent depressions 47.

Figure 9:
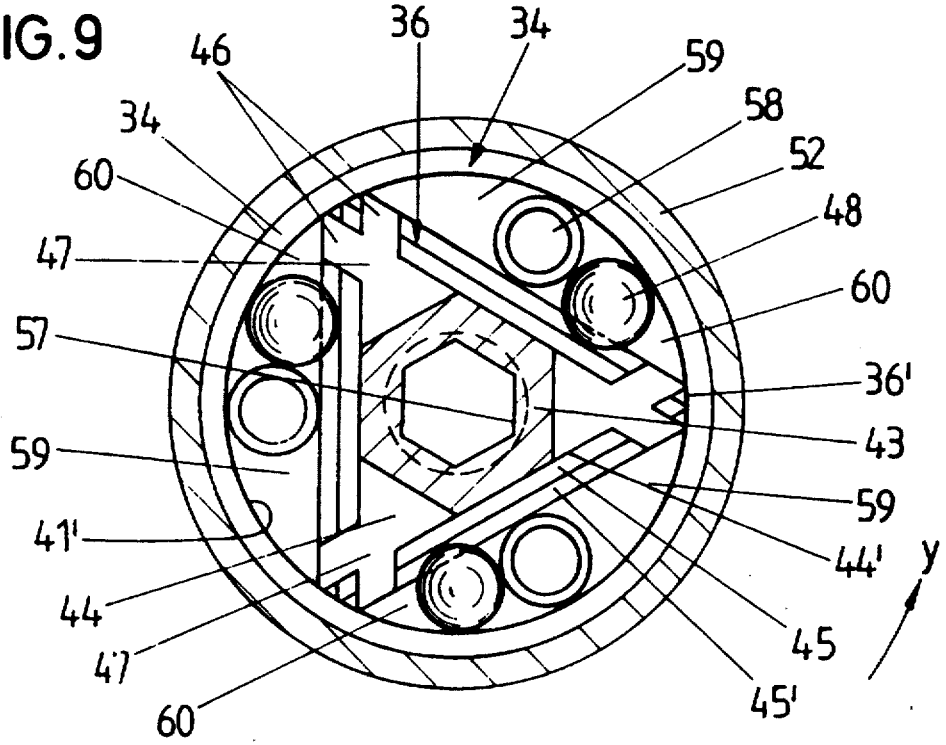
FIG. 9 is also a cross section corresponding to FIG. 7, with the switch member moved into the other switch position.
Figure 10:
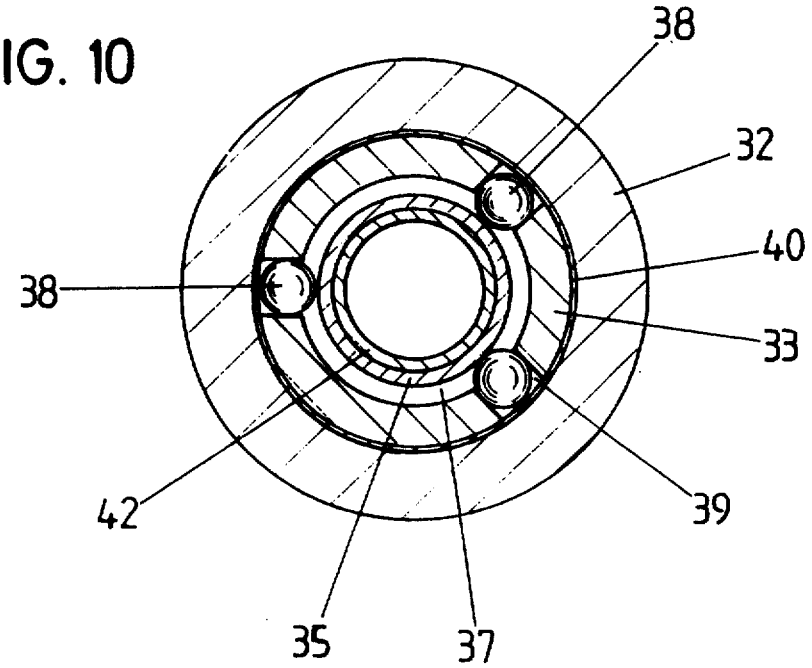
FIG. 10 is a section along the line X—X of FIG. 6.

In accordance with FIG. 9, the switch member ring 50 has been turned in the direction of the arrow y. In this way the detent balls 48 also have left the detent depressions 47 and have entered into the clamping corners 60. There they also receive a three-point support and push the clamping members into the clamping corners 59. Upon a turning of the drive ring part 34 in the direction of the arrow y, the driven core part 36 is therefore also carried along in the direction of this arrow. The opposite rotation of the drive core part then corresponds to the direction of free travel.

I claim:

1. In a screw tool with direction-reversible catch, the tool comprising an outer drive ring part, and an inner driven core part of approximately triangular cross section;

a rotatable switch member having a plurality of drivers extending therefrom and arranged circumferentially around said core part;

clamping members in wedge-shaped clamping spaces between said outer drive ring part and said inner driven core part, which clamping members are displaceable by said rotatable switch member which is lockable in its switch positions, each of said wedge-shaped clamping spaces having two clamping positions at opposite ends of a clamping space for receiving and clamping one of the clamping members; and wherein said drivers act on the clamping members and block passage of the clamping members into respectively one of their two clamping positions and wherein;

in two switch positions of the switch member, each of said clamping members is loosely disposed in a separate of said clamping spaces and is displaceable into a clamping position therein exclusively by rotation of the drive ring part;

in a central switch position of said switch member, each of said clamping bodies is located substantially centrally to a corresponding side of said driven core part;

vertices of said core part are arranged concentrically about said core part to separate said clamping spaces, said drivers being located at respective ones of said vertices and being translatable in circumferential direction relative to said vertices upon rotation of said switch member about said core part; and said drivers extend in circumferential direction into said clamping spaces to limit movement of said clamping members in said clamping spaces to a predetermined region of unobstructed movement, a circumferentiakl length of said predetermined region of unobstructed movement being approximately equal to a circumferential length of a driver.

2. A screw tool according to claim 1, wherein said driven core part has said sides formed with barreled shape with a smaller degree of curvature than that of said drive ring part.

3. A screw tool according to claim 1, wherein said driven core part carries a spring-loaded detent ball on one of its angle bisectors in a blind bore, detent depressions opposite said ball, said detent depressions being formed on an inner wall of said switch member, the latter having said drivers in the form of axially protruding fingers, said switch member being cup-shaped.

4. A screw tool according to claim 3, wherein said driven core part forms concentrically extending guide surfaces disposed transverse to said angle bisectors and which rest against said cup inner wall.

5. A screw tool according to claim 3, wherein said driven core part has a central guide collar adapted to enter into a bore within a cup bottom of said switch member.

6. A screw tool according to claim 5, wherein said driven core part has, opposite the guide collar, a guide sleeve which protrudes into a screwdriver handle inner member, said sleeve having a wall surface provided with bearing ribs bearing against said inner member, and said inner member is one-piece with said drive ring part.

7. A screw tool according to claim 1, wherein said clamping members are shaped as rollers and rest only with a part of one of their end surfaces on bottom surfaces formed in the region of said clamping spaces by protrusions of said driven core part.

8. A screw tool according to claim 7, wherein outer edges of the bottom surfaces and guide surfaces of said driven core part supplement each other to form a circle.

9. A screw tool according to claim 7, wherein said drivers extend to the bottom surfaces and said clamping members have axial lengths corresponding to that of the drivers so that another end surface of the clamping members is gripped by a cup rim surface of said switch member, said switch member being cup-shaped.

10. A screw tool according to claim 3, wherein said detent depressions provided three switch positions and comprise a central one of said detent depressions corresponding to said central switch position which is operative in both directions of rotation and has a shape complementary to said detent ball, and two of said detent depressions directly adjacent said central detent depression which are each enlarged in shape in the directions of rotation and each provided with a concave bottom.

11. A screw tool according to claim 1, wherein said switch member in said switch positions is lockable in different relative positions to said driven core part.

12. A screw tool according to claim 11, wherein said drive ring part and said driven core part are relatively rotatably mounted.

13. A screw tool according to claim 1, wherein in said central switch position said drivers are adjacent lateral ends of said sides of said driven core part and spaced apart from said clamping members.

14. A screw tool according to claim 1, wherein in said two switch positions of said switch member said drivers are adjacent said clamping members.

15. A screw tool according to claim 8, wherein said guide surfaces of said driven core part relatively rotatably engage on an inner wall of said switch member.

*16. In a screw tool with direction-reversible catch, the tool comprising an outer ring part, and an inner core part of approximately polygonal cross section;*

*a rotatable switch member having a plurality of drivers extending therefrom and arranged circumferentially around said core part, said switch member being lockable in a plurality of switch positions;*

*plural clamping members disposed around said core part, said clamping members being located in wedge-shaped clamping spaces between said outer ring part and said inner core part, said clamping members being displaceable by said rotatable switch member, each of said wedge-shaped clamping spaces having two clamping positions at opposite ends of a clamping space for receiving and clamping one of the clamping members; and*

*wherein said drivers act on the clamping members to limit passage of each clamping member within one of its two clamping positions;*

*in two switch positions of the switch member, each of said clamping members is loosely disposed in a separate one of said clamping spaces and is displaceable into a clamping position therein by rotation of the ring part;*

*in a central switch position of said switch member, each of said clamping bodies is located substantially centrally of a corresponding side of said core part;*

*vertices of said core part are arranged concentrically about said core part to define said clamping spaces, said drivers being located at respective ones of said vertices and being translatable in circumferential direction relative to said vertices upon rotation of said switch member about said core part; and*

*said drivers limit movement in circumferential direction within each of said clamping spaces of said clamping members to a predetermined region of unobstructed movement, a circumferential length of said predetermined region of unobstructed movement being greater than approximately twice the diameter of a clamping member.*

*17. In a screw tool with direction-reversible catch, the tool comprising an outer ring part, and an inner core part of approximately polygonal cross section;*

*a rotatable switch member having a plurality of drivers extending therefrom and arranged circumferentially around said core part, said switch member being lockable in a plurality of switch positions;*

*plural clamping members disposed around said core part, said clamping members being located in wedge-shaped clamping spaces between said outer ring part and said inner core part, said clamping members being displaceable by said rotatable switch member, each of said wedge-shaped clamping spaces having two clamping positions at opposite ends of a clamping space for receiving and clamping one of the clamping members; and*

*wherein said drivers act on the clamping members to limit passage of each clamping member within one of its two clamping positions;*

*in two switch positions of the switch member, each of said clamping members is loosely disposed in a separate one of said clamping spaces and is displaceable into a clamping position therein by rotation of the ring part;*

*in a central switch position of said switch member, each of said clamping bodies is located substantially centrally of a corresponding side of said core part;*

*vertices of said core part are arranged concentrically about said core part to define said clamping spaces, said drivers being located at respective ones of said vertices and being translatable in circumferential direction relative to said vertices upon rotation of said switch member about said core part;*

*said core part carries a spring-loaded detent ball, and three detent depressions are formed on a wall of said switch member for providing three of said switch positions; and*

*said detent depressions include a central detent depression corresponding to said central switch position which is operative in both directions of rotation of said switch member and has a shape complementary to said detent ball, said detent depressions further comprising two further detent depressions disposed on opposite sides of said central detent depression, the two further detent depressions being enlarged relative to the central depression in the directions of rotation of said switch member.*

*18. A screw tool according to claim 17, wherein*

*said polygonal cross section is a triangular cross section.*

*19. A screw tool according to claim 17, wherein*

*each of said further detent depressions is formed with a curved concave surface.*

*20. A screw tool according to claim 19, wherein*

*a radius of curvature of the concave surface of each of said further detent depressions is larger than a radius of curvature of said detent ball.*

*21. A screw tool according to claim 17, wherein*

*a cross-sectional dimension of each of said further detent depressions is larger than a cross-sectional dimension of said detent ball.*

*22. A screw tool according to claim 17, wherein*

*an enlargement of each of said further detent depressions relative to said central depression is sufficient to allow for movement of the detent ball in either of said further detent depressions in a direction of rotation of said switch member.*

*23. In a screw tool with direction-reversible catch, the tool comprising an outer ring part, and an inner core part of generally polygonal cross section;*

*a rotatable switch member having a plurality of drivers extending therefrom and arranged circumferentially around said core part, said switch member being lockable in a plurality of switch positions;*

*plural clamping members disposed around said core part, said clamping members being located in wedge-shaped clamping spaces between said outer ring part and said inner core part, said clamping member being displaceable by said rotatable switch member, each of said wedge-shaped clamping spaces having two clamping positions at opposite ends of a clamping space for receiving and clamping one of the clamping members; and*

*wherein said drivers act on the clamping members to limit passage of each clamping member within one of its two clamping positions;*

*in two switch positions of the switch member, each of said clamping members is loosely disposed in a separate one of said clamping spaces and is displaceable into a clamping position therein by rotation of the ring part;*

*in a central switch position of said switch member, each of said clamping bodies is located substantially centrally of a corresponding side of said core part;*

*vertices of said core part are arranged concentrically about said core part to define said clamping spaces, said drivers being located at respective ones of said vertices and being translatable in circumferential direction relative to said vertices upon rotation of said switch member about said core part;*

*said core part carries a spring-loaded detent element having a curved surface, and three detent depressions*

*are formed on a wall of said switch member for providing three of said switch positions; and*

*said detent depressions include a central detent depression corresponding to said central switch position which is operative in both directions of rotation of said switch member and has a shape complementary to said detent element, said detent depressions further comprising two further detent depressions disposed on opposite sides of said central detent depression, the two further detent depressions being enlarged relative to the central depression in the directions of rotation of said switch member to permit movement of said detent element within either of said further detent depressions.*

*24. A screw tool with direction-reversible catch, the tool comprising*

*an outer ring part, and an inner core part of approximately polygonal cross section;*

*a rotatable switch member having a plurality of drivers extending therefrom and arranged circumferentially around said core part, said switch member being lockable in a plurality of switch positions;*

*plural clamping members disposed around said core part, said clamping members being located in wedge-shaped clamping spaces between said outer drive ring part and said core part, said clamping members being displaceable by said rotatable switch member, each of said wedge-shaped clamping spaces having two clamping positions at opposite ends of a clamping space for receiving and clamping one of the clamping members; and*

*wherein said drivers act on the clamping members to limit passage of each clamping member within one of its two clamping positions;*

*in two switch positions of the switch member, each of said clamping members is disposed in a separate one of said clamping spaces and is displaceable into a clamping position therein by rotation of said ring part relative to said core part;*

*constrictions of said clamping spaces are arranged concentrically about said core part, said drivers being located at respective ones of said constrictions and being translatable in circumferential direction through respective ones of said constrictions upon rotation of said switch member about said core part;*

*said screw tool further comprises detent means for positioning said switch member relative to the constrictions of said clamping spaces, said detent means including a detent element movable in radial direction and fixed in circumferential direction relative to said constrictions, said detent means including an arrangement of detent depressions disposed on said switch member for receiving said detent element; and*

*a first and a second of said detent depressions are disposed on opposite sides of a center of said arrangement of detent depressions, said first and said second detent depressions being enlarged relative to said detent element in the directions of rotation of said switch member to permit movement of said detent element within either of said first and said second detent depressions.*

*25. A screw tool with direction-reversible catch, the tool comprising*

*an outer ring part, and an inner core part of generally polygonal cross section;*

*a rotatable switch member having a plurality of drivers extending therefrom and arranged circumferentially around said core part, said switch member being lockable in a plurality of switch positions;*

*plural clamping members disposed around said core part, said clamping members being located in wedge-shaped clamping spaces between said ring part and said core part, said clamping members being displaceable by said rotatable switch member, each of said wedge-shaped clamping spaces having two clamping positions at opposite ends of a clamping space for receiving and clamping one of the clamping members; and*

*wherein said drivers act on the clamping members to limit passage of each clamping member within one of its two clamping positions;*

*in two switch positions of the switch member, each of said clamping members is disposed in a separate one of said clamping spaces and is displaceable into a clamping position therein by rotation of said ring part relative to said core part;*

*constrictions of said clamping spaces are arranged concentrically about said core part, said drivers being located at respective ones of said constrictions and being translatable in circumferential direction through respective ones of said constrictions upon rotation of said switch member about said core part; and*

*said screw tool further comprises a spring-loaded detent element having a curved surface, and an arrangement of plural detent depressions are formed on a wall of said switch member for receiving said detent element to provide said switch positions; and*

*a first and a second of said detent depressions are disposed on opposite sides of a center of said arrangement of detent depressions, said first and said second detent depressions being enlarged relative to said detent element in the direction of rotation of said switch member to permit movement of said detent element within either of said first and said second detent depressions.*

*26. A screw tool with direction-reversible catch, the tool comprising*

*an outer ring part, and an inner core part of approximately polygonal cross section;*

*a rotatable switch member having a plurality of drivers extending therefrom and arranged circumferentially around said core part, said switch member being lockable in a plurality of switch positions;*

*plural clamping members disposed around said core part, said clamping members being located in wedge-shaped clamping spaces between said ring part and said core part, each of said wedge-shaped clamping spaced having two clamping positions at opposite ends of a clamping space for receiving and clamping one of said clamping members;*

*wherein said clamping members are displaceable by said switch member into a clamping position of a respective clamping space and provide a clamping upon rotation of said ring part relative to said core part;*

*said drivers are operable to limit passage of each clamping member within its clamping space to one of its two clamping positions;*

*constrictions of said clamping spaces are arranged concentrically about said core part, said drivers being located at respective ones of said constrictions and being translatable in circumferential direction through respective ones of said constrictions upon rotation of said switch member about said core part; and*

*said drivers limit movement in circumferential direction within each of said clamping spaces of said clamping members to a predetermined region of unobstructed movement, a circumferential length of said predetermined region of unobstructed movement being greater than approximately twice the diameter of a clamping member.*

* * * * *